(12) United States Patent
Contreras et al.

(10) Patent No.: US 12,717,293 B2
(45) Date of Patent: Aug. 25, 2026

(54) SYSTEMS AND METHODS FOR OPTIMAL CONTROL OF SMART APPLIANCES BY ENERGY EFFICIENT AUTONOMOUS SYSTEMS

(71) Applicant: Samsung Electronics Company, Ltd., Suwon si (KR)

(72) Inventors: Osvaldo Garcia Contreras, Vancouver (CA); Davinder Pal Singh, Coquitlam (CA)

(73) Assignee: SAMSUNG ELECTRONICS COMPANY, LTD., Suwon City (KR)

( * ) Notice: Subject to any disclaimer, the term of this patent is extended or adjusted under 35 U.S.C. 154(b) by 291 days.

(21) Appl. No.: 18/450,070

(22) Filed: Aug. 15, 2023

(65) Prior Publication Data

US 2025/0060713 A1 Feb. 20, 2025

(51) Int. Cl.
*G05B 15/02* (2006.01)
*H04L 12/28* (2006.01)

(52) U.S. Cl.
CPC ............ *G05B 15/02* (2013.01); *H04L 12/282* (2013.01); *H04L 12/2823* (2013.01); *H04L 2012/285* (2013.01)

(58) Field of Classification Search
CPC ... G05B 15/02; H04L 12/282; H04L 12/2823; H04L 2012/285; H05B 47/115; H05B 47/19; H05B 47/1965; Y02B 20/40
See application file for complete search history.

(56) References Cited

U.S. PATENT DOCUMENTS

| | | | | |
|---|---|---|---|---|
| 9,078,299 B2 | | 7/2015 | Ashdown | |
| 9,936,556 B2 | | 4/2018 | Chraibi | |
| 10,973,107 B2 | | 4/2021 | Charlton | |
| 10,986,720 B2 | | 4/2021 | Lark | |
| 2006/0139659 A1 | * | 6/2006 | Steinberg .................. | F21S 2/00 356/614 |
| 2013/0020949 A1 | * | 1/2013 | Mohan .................. | H05B 47/11 315/158 |

(Continued)

FOREIGN PATENT DOCUMENTS

| | | | | |
|---|---|---|---|---|
| CA | 2973825 C | | 3/2018 | |
| GB | 2341017 | * | 1/2000 | ............ H05B 37/04 |
| JP | 6469686 B2 | | 2/2019 | |

*Primary Examiner* — Eric J Yoon
(74) *Attorney, Agent, or Firm* — Baker Botts L.L.P.

(57) ABSTRACT

In one embodiment, a method includes determining an edge device has entered a control area containing smart appliance(s), accessing sensor data and relative displacement data via sensors of the edge device from the edge device responsive to determining the edge device has entered the control area, wherein the relative displacement data indicates a distance of the edge device from each smart appliance in the control area and is calculated by the edge device based on the sensor data, determining environmental parameters in the control area are not satisfied based on the sensor data, determining modifications to operating parameters of a first smart appliance responsive to determining that the environmental parameters are not satisfied, wherein the first smart appliance is selected based on the relative displacement data, and sending instructions for modifying the operating parameters based on the modifications to the first smart appliance.

17 Claims, 8 Drawing Sheets

(56) References Cited

U.S. PATENT DOCUMENTS

| | | | | |
|---|---|---|---|---|
| 2014/0265938 | A1* | 9/2014 | Liu | H05B 47/19<br>315/362 |
| 2016/0007421 | A1* | 1/2016 | Tey Pons | H05B 47/12<br>315/153 |
| 2018/0368239 | A1* | 12/2018 | Meerbeek | G06F 3/04883 |
| 2020/0329546 | A1* | 10/2020 | Krajnc | H05B 47/1985 |
| 2022/0159811 | A1 | 5/2022 | Campanella | |

* cited by examiner

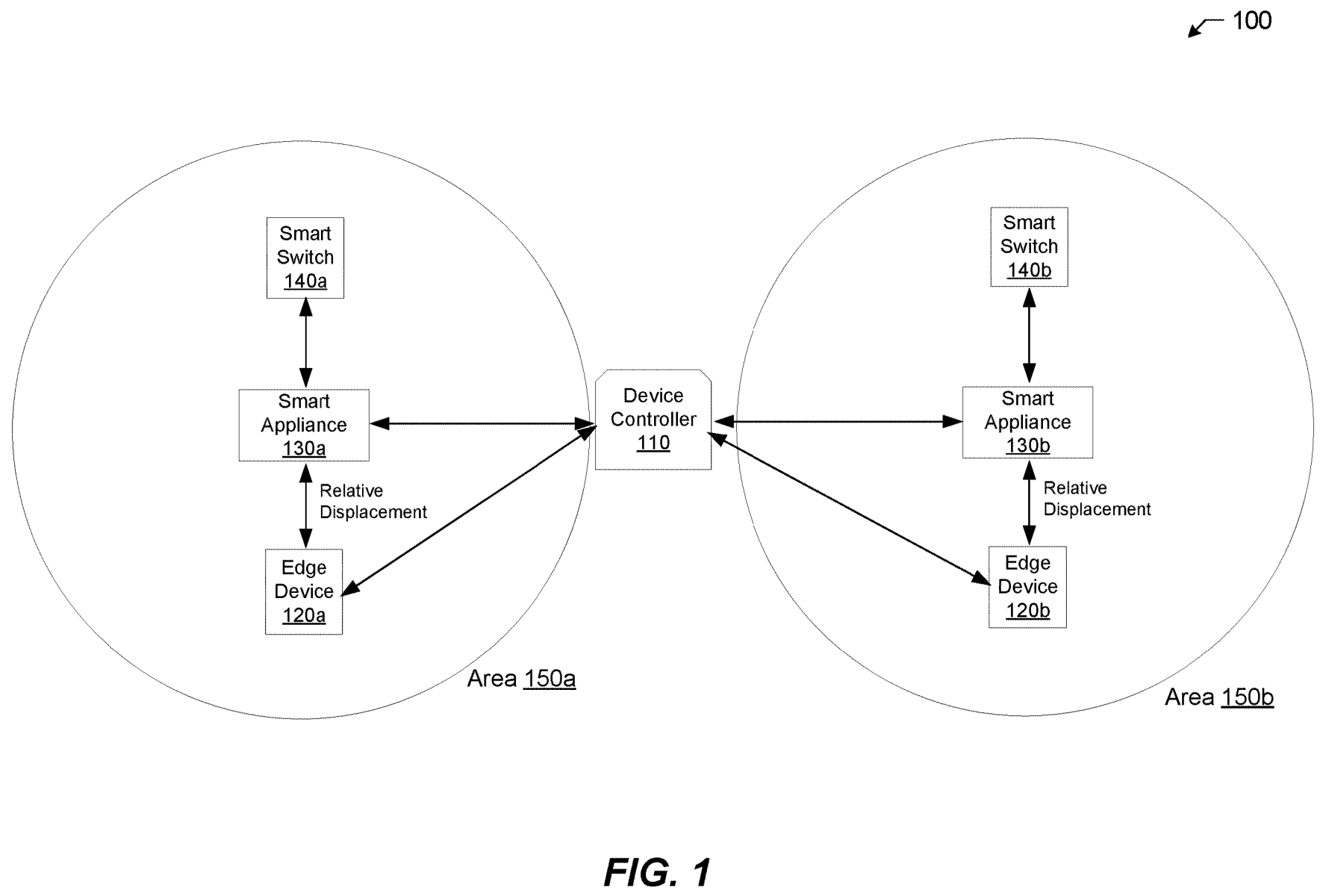

100

Area 150b

Smart Switch 140b

Smart Appliance 130b

Relative Displacement

Edge Device 120b

Device Controller 110

Area 150a

Smart Switch 140a

Smart Appliance 130a

Relative Displacement

Edge Device 120a

FIG. 1

SYSTEMS AND METHODS FOR OPTIMAL CONTROL OF SMART APPLIANCES BY ENERGY EFFICIENT AUTONOMOUS SYSTEMS

TECHNICAL FIELD

This disclosure relates generally to device control within network environments, and in particular relates to device control by energy efficient autonomous systems.

BACKGROUND

Electricity plays a critical role in any office environment because it powers computers, lights, servers, and numerous other equipment. The power bill is a substantial expenditure for any commercial office. A U.S. office building spends nearly 29 percent of its operating expenses on utilities, and the majority of this expenditure goes toward electricity and natural gas. For the average office building, energy costs can exceed $30,000 per year. On average, lighting amounts to 39% of the electricity bill. Reducing energy consumption saves money, increases energy security, and reduces the pollution that is emitted from non-renewable sources of energy. In any big office environment, there are instances where there are spaces in the office where there is no occupancy but still, the power is used by using heating, lighting, or other appliances. There are situations when an office is having enough daylight but instead of using the daylight, the lights are used which leads to energy wastage.

Several approaches have been already taken to reduce the power bill. These approaches can broadly be categorized into the following categories. One category can be timer-based control, which may use a pre-fixed schedule to control smart appliances. Another category can be occupancy sensor for smart appliances, which may use the occupancy sensor that detects the presence of movement within a given range and controls the smart appliances when the space has no occupancies thereby saving energy. Another category can be daylight-linked controls, which may focus on harvesting daylight instead of using artificial lights. Daylight-linked controls may use photo sensors to detect the presence of daylight that is installed in appropriate places. The aforementioned approaches may have some shortcomings. For instance, daylight-linked control (DLC) systems may be tough to install because calibrating the sensors can be a difficult process. Some of the DLC systems may not take into account user preferences which leads to people turning off the system.

BRIEF DESCRIPTION OF THE DRAWINGS

FIG. 1 illustrates an example autonomous system for optimizing environment conditions.

DESCRIPTION OF EXAMPLE EMBODIMENTS

Figure 2:
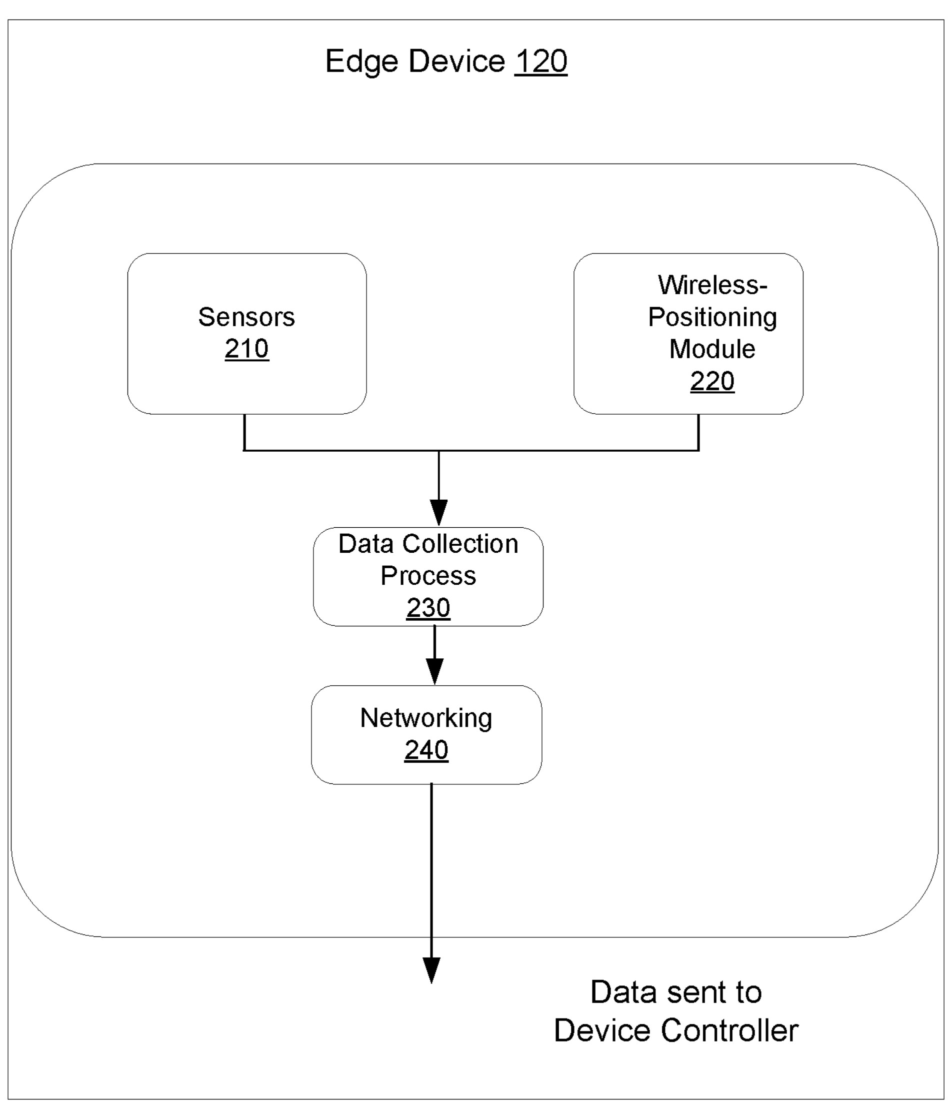
FIG. 2 illustrates an example architecture of an edge device.

Optimal Control of Smart Appliances by Energy Efficient Autonomous Systems

In particular embodiments, an autonomous system may use at least the relative displacement (distance and direction) between edge devices and smart appliances and measurements of sensor values from the edge devices to collectively find the optimal working state of a smart appliance. The system may use a feedback-based algorithm to select the most appropriate smart appliance to reach optimal state of the environment around the edge devices. In particular embodiments, the system may exclude or consider partially the edge devices that may be giving less accurate measurements. The users may be given ability to decide the optimal state of environment according to their preferences. In particular embodiments, the system may be dynamic in the sense that it may avoid using any static sensors such as occupancy sensors. Compared to existing approaches for improving energy efficiency that may not take into account the mobility aspects of a user, the embodiments disclosed herein may allow the user to move from one control area (e.g., a room) to another control area while the autonomous system adjusting each control area to the optimal state of the environment. Although this disclosure describes optimizing particular environment state by particular systems in a particular manner, this disclosure contemplates optimizing any suitable environment state by any suitable system in any suitable manner.

In particular embodiments, a device controller may determine that a first edge device has entered a control area. The control area may contain one or more smart appliances. The device controller may then access, via one or more sensors associated with the first edge device from the first edge device responsive to determining the first edge device has entered the control area, first sensor data and first relative displacement data at a first time. In particular embodiments, the first relative displacement data may indicate a distance of the first edge device from each of the one or more smart appliances in the control area. The first relative displacement data may be calculated by the first edge device based on the first sensor data. The device controller may then determine, based on the first sensor data, one or more environmental parameters in the control area are not satisfied at the first time. In particular embodiments, the device controller may determine, responsive to determining that the environmental parameters are not satisfied, one or more first modifications to one or more operating parameters of a first smart appliance of the one or more smart appliances. The one or more first modifications to the one or more operating parameters may be based on the first sensor data. In particular embodiments, the first smart appliance may be selected based on the first relative displacement data. The device controller may further send, to the first smart appliance, instructions for modifying the one or more operating parameters based on the first modifications.

Certain technical challenges exist for automated control of smart appliances. One technical challenge may include effectively determining optimal environment conditions. The solution presented by the embodiments disclosed herein to address this challenge may be using sensor values of edge devices in the environment as the sensor values measure different environmental parameters reflecting the environment condition. Another technical challenge may include adaptively modifying operating parameters of smart appliances. The solution presented by the embodiments disclosed herein to address this challenge may be using a feedback-based algorithm to modify operating parameters of smart appliances as the feedback-based algorithm can provide information in an iterative manner about whether modifying operating parameters of a smart appliance helps reach the optimal environment condition and whether operating parameters of one or more other smart appliance should be modified to reach the optimal environment condition.

Certain embodiments disclosed herein may provide one or more technical advantages. A technical advantage of the embodiments may include energy efficiency as the autonomous system can help to reduce energy consumption by turning off smart appliances when they are not needed and adjusting the operating levels of the smart appliances based on the environment conditions. Another technical advantage of the embodiments may include eliminating the need to install sensors because the embodiments disclosed herein leverage edge devices that come with preinstalled sensors to create a dynamic system which accounts into mobility, sensor values and user preferences to choose the best smart appliance and its corresponding operating parameters. Another technical advantage of the embodiments may include user convenience as the autonomous system can be controlled remotely, e.g., using a smartphone app, which allows the user to adjust the environment condition in the space without physically interacting with the physical switches or appliances. This can be particularly convenient for users who are unable to reach or operate physical switches or physical appliances. Another technical advantage of the embodiments may include easy customization because as a software-based solution, the autonomous system can be programmed with specific preferences and settings, such as the desired level of illumination depending on the location of the light bulb. This may allow the user to customize the smart appliances in the space to suit their needs and preferences. Certain embodiments disclosed herein may provide none, some, or all of the above technical advantages. One or more other technical advantages may be readily apparent to one skilled in the art in view of the figures, descriptions, and claims of the present disclosure.

In particular embodiments, a device controller may determine that a first edge device has entered a control area. The control area may contain one or more smart appliances. The device controller may then access, from the first edge device responsive to determining the first edge device has entered the control area, first sensor data and first relative displacement data. In particular embodiments, the first relative displacement data may indicate a distance of the first edge device from each of one or more smart appliances in the control area. The device controller may then determine, based on the first sensor data, one or more environmental parameters in the control area are not satisfied. In particular embodiments, the device controller may determine, responsive to determining that the environmental parameters are not satisfied, one or more first modifications to one or more operating parameters of the first smart appliance. In particular embodiments, the first smart appliance may be identified based on the first relative displacement data. The device controller may further send, to the first smart appliance, instructions for modifying the one or more operating parameters based on the first modifications.

In particular embodiments, the autonomous system may calculate optimal environment conditions such as lighting and current temperature in a room using the one or more edge devices. As an example and not by way of limitation, the edge device may be any mobile device with sensors, such as a cellphone, a smartwatch, etc. The edge device may have multiple sensors that detect ambient light intensity, temperature, humidity, air quality (e.g., pollutant or pollen count), or sound in a room and share the information with a device controller. In other words, the first sensor data may comprise one or more sensor values associated with one or more of temperature, lighting, humidity, air quality, or sound. In particular embodiments, the device controller may use a feedback-based algorithm with information such as distance from the smart appliance and sensor values to determine the current desirable state of the smart appliance for optimal environment condition. If there is no edge device in the room, the smart appliance may be controlled based on predetermined or default values. In particular embodiments, the predetermined or default value may be based on the current weather condition, historic data, user preferences etc. As an example and not by way of limitation, the current weather conditions and time of the day may be used to calculate if the smart appliance needs to be turned on. In particular embodiments, determining the one or more environmental parameters in the control area are not satisfied may be further based on user preferences associated with the control area. As a result, the embodiments disclosed herein may have a technical advantage of easy customization because as a software-based solution, the autonomous system 100 can be programmed with specific preferences and settings, such as the desired level of illumination depending on the location of the light bulb. This may allow the user to customize the smart appliances in the space to suit their needs and preferences. In particular embodiments, determining the one or more environmental parameters in the control area are not satisfied may be further based on historical usage data associated with the control area. Using sensor values of edge devices in the environment may be an effective solution for addressing the technical challenge of effectively determining optimal environment conditions as the sensor values measure different environmental parameters reflecting the environment condition.

FIG. 1 illustrates an example autonomous system 100 for optimizing environment conditions. The autonomous system 100 may comprise a device controller 110, configuration settings, one or more edge devices 120, one or more smart appliances 130, and manual override. As an example and not by way of limitation, the smart appliances 130 may include light bulbs, air conditioning units, window blinds, or cameras. The smart appliances 130 may communicate with smart switches 140. As illustrated in FIG. 1, the device controller 110 may control multiple areas 150. Each area 150 may have its own edge device 120. In particular embodiments, the device controller 110 may act as the brain of the system and decide whether to control (e.g., smart switch 140 on) a particular smart appliance 130 based on the environmental condition and the number of users around the smart appliance 130. In particular embodiments, the autonomous system 100 may use relative displacement (e.g., distance and direction) between the smart appliance 130 and edge device 120. In particular embodiments, the first relative displacement data may further indicate an orientation of a first user associated with the first edge device 120 with respect to each of the plurality of smart appliances 130. The autonomous system 100 may utilize sensors such as light sensors, temperature sensors and proximity sensors to find optimal environment conditions. In particular embodiments, the optimal environment condition may be calculated using a feedback-based algorithm.

FIG. 2 illustrates an example architecture 200 of an edge device 120. In particular embodiments, an edge device 120 may be a type of computing device that is located at the edge of a network, close to the source of data. Edge devices 120 may often be used in Internet of Things (IoT) and other distributed systems, where it is important to minimize latency and reduce the amount of data that is transmitted over the network. In particular embodiments, the edge device 120 may comprise one or more sensors 210. As an example and not by way of limitation, an edge device 120 may be a smart phone or a wearable device with sensors, such as temperature or light sensors. The sensors 210 may be utilized for different functionalities. As an example and not by way of limitation, an edge device 120 may make use of a light sensor to control the brightness of a light bulb to provide a user with better visibility. In particular embodiments, an edge device 120 may also communicate with other edge devices 120 to find the accurate reading. As an example and not by way of limitation, a smart watch may share values from the light sensor with a phone. In particular embodiments, the edge device 120 may provide a sensor reading in an open space to the device controller 110. As an example and not by way of limitation, the sensor reading may be an average reading of the lighting or temperature in the open space. As a result, the embodiments disclosed herein may have a technical advantage of the embodiments may include eliminating the need to install sensors because the embodiments disclosed herein leverage edge devices 120 that come with preinstalled sensors 210 to create a dynamic system which accounts into mobility, sensor values and user preferences to choose the best smart appliance 130 and its corresponding operating parameters.

In particular embodiments, the edge device 120 may have a wireless positioning module 220. The wireless positioning module 220 may help the edge device 120 measure relative displacement (e.g., distance and direction) of the edge device 120 in relation to other smart appliances 130. As an example and not by way of limitation, the distance and direction may be measured using ways such as, but not limited to, using cameras or using ultra-wide band (UWB) transmitters and receivers. In particular embodiments, data from the sensors 210 and the wireless positioning module 220 may go through data collection process 230. The collected data may be sent to the device controller 110 via the networking 240. In particular embodiments, the edge device 120 may communicate the displacement between the edge device 120 and the smart appliances 130, as well as readings from the sensors 210 to the device controller 110.

In particular embodiments, the edge device 120 may also validate whether a sensor reading is correct by using one or more sensors 210 such as proximity sensors. As an example and not by way of limitation, the proximity sensor may help in finding out a situation where the light sensor is covered by an object, for instance, when the edge device 120 is in the pocket of the user. The edge device 120 may provide partial measurements such that one or more sensor values are not present but other sensor values are present. In particular embodiments, the edge devices 120 may be excluded or considered partially by the autonomous system if they are giving less accurate measurements.

In particular embodiments, the device controller 110 may determine that a second edge device 120 has entered the control area. The device controller 110 may then access, from the second edge device 120 responsive to determining the second edge device 120 has entered the control area, second sensor data and second relative displacement data. In particular embodiments, the second relative displacement data may indicate a distance of the second edge device 120 from each of the plurality of smart appliances 130. In particular embodiments, determining the one or more environmental parameters in the control area are not satisfied may be further based on the second sensor data. In addition, the first smart appliance 130 may be identified further based on the second relative displacement data.

Figure 3:
FIG. 3 illustrates an example flow diagram for optimal control of smart appliances.
Figure 3:
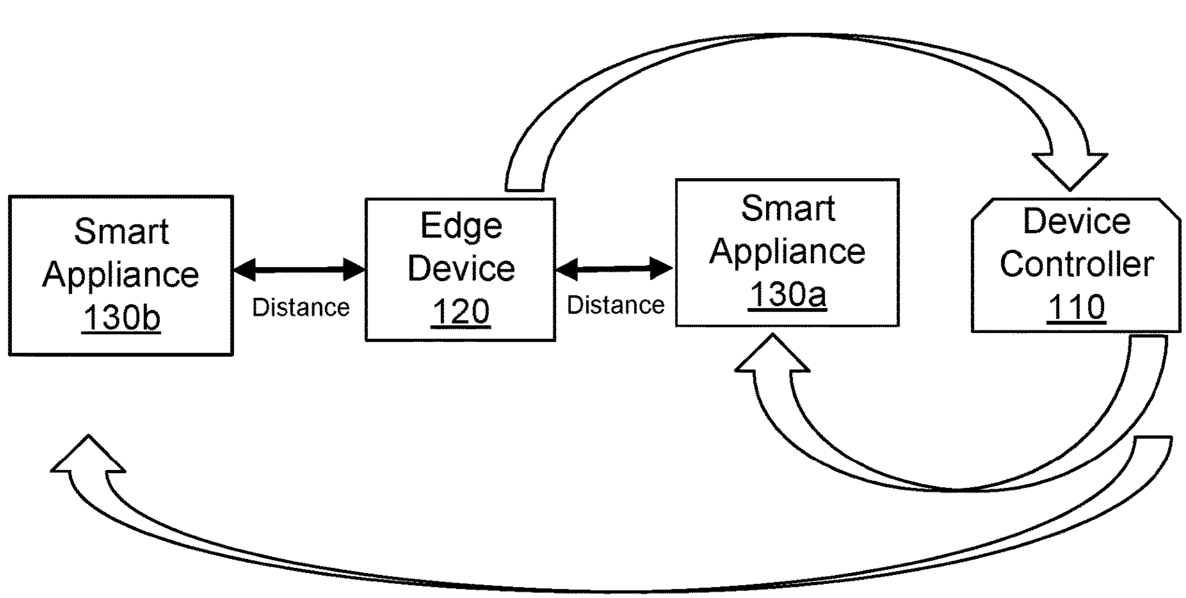

FIG. 3 illustrates an example flow diagram 300 for optimal control of smart appliances. In particular embodiments, the sensors 210 on the edge device 120 may provide the device controller 110 with the first reading of the current environment (e.g., temperature, light, humidity, etc.). The device controller 110 may then compare the first readings to parameters associated with an ideal working space. If the first readings do not match the ideal parameters, the device controller 110 may turn on the closest smart appliance 130 to the user, e.g., smart appliance 130*a*. In particular embodiments, the edge device 120 may provide second readings for the current environment to the device controller 110. The device controller 110 may again compare the second readings to the parameters associated with the ideal working space. If the second readings still do not match the ideal working parameters, the device controller 110 may turn on the second closest smart appliance 130 to the user, e.g., smart appliance 130*b*. As can be seen, the device controller 110 may analyze what is the best smart appliance 130 to be turned on for the optimal result. As a result, the embodiments disclosed herein may have a technical advantage of energy efficiency as the autonomous system 100 can help to reduce energy consumption by turning off smart appliances 130 when they are not needed and adjusting the operating levels of the smart appliances 130 based on the environment conditions In particular embodiments, the device controller 110 may enable the communication between the edge devices 120 and the smart appliances 130. The device controller 110 may decide the optimal state of a smart appliance 130, e.g., whether to switch on the smart appliance 130 or not. The device controller 110 may be situated in a smart hub. In particular embodiments, the device controller 110 may collect data from different smart appliances 130 and maintain an active list of users around each smart appliance 130. An active list of users may be the list of the edge devices 120 that are in the range of a smart appliance 130. As an example and not by way of limitation, in case of lighting, an active list of users for a smart bulb may include users who current locations can be illuminated by the light from the smart bulb. In particular embodiments, the active user list may include information associated with the edge devices 120 such as device name, device identifier, device distance, device illumination sensor value (the value from the illumination sensors or temperature sensor). The active user list may be associated with each smart appliance. In particular embodiments, the device controller 110 may be responsible in maintaining the active user list. The device controller 110 may also determine outlier edge devices 120. In particular embodiments, outlier edge device 120 may comprise edge devices 120 whose measurements are not in line with other edge devices 120.

Figure 4A:
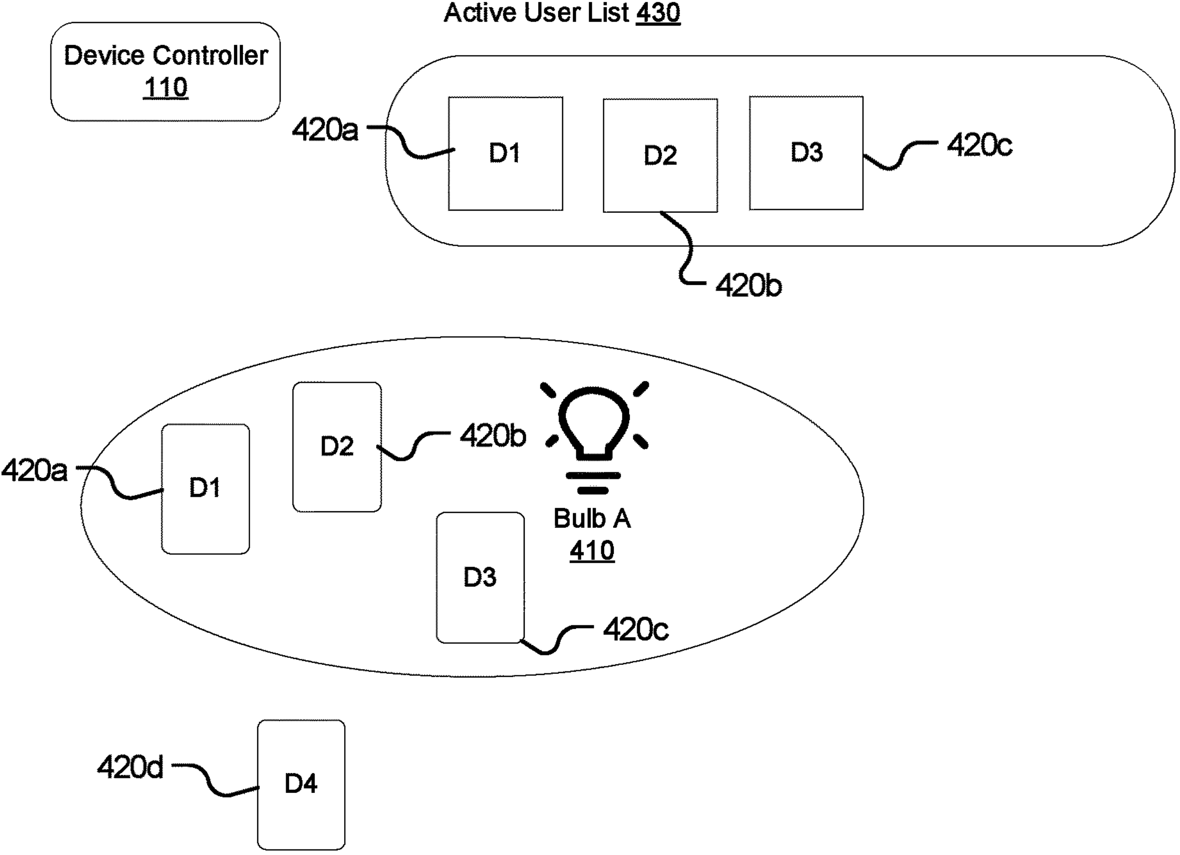
FIGS. 4A-4B illustrates an example maintenance of an active user list for a smart bulb.
Figure 4B:
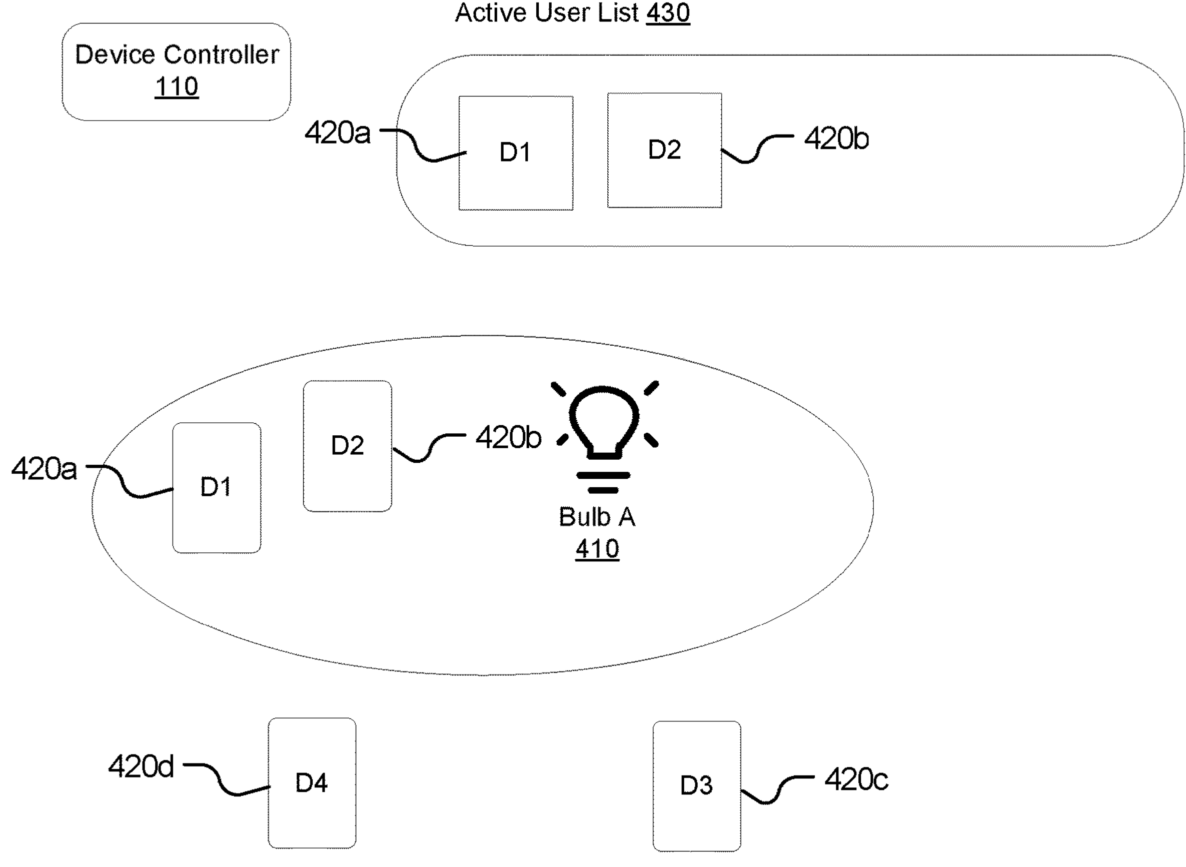

FIGS. 4A-4B illustrates an example maintenance of an active user list for a smart bulb. As illustrated in FIGS. 4A-4B, there may be four users associated with their respective edge devices 120. The light source, i.e., bulb A 410 may be at distance D1, D2, D3, and D4 with respect to the four users 420*a*-420*d* in an ascending order. In particular embodiments, there may be a range (denoted by R) of the given light source defined in its associated configurations for the light source (bulb A 410). If the range R is greater than D1, D2, and D3 but smaller than D4, the active user list 430 may have three users, i.e., user 420*a*, user 420*b*, and user 420*c*. If the distance of an edge device 120 to the light source increase due to mobility such that it is greater than the range R, the edge device 120 may be removed from the active user list 430. As illustrated in FIG. 4B, the distance D3 increased to be greater than the range R, so user 420*c* may be removed from the active user list 430. Similarly, an active user list 430 may be maintained for electrical appliances such as smart thermostat. In case there is no smart thermostat installed, the device controller 110 may use distance from the smart light to maintain the active user list 430 but use different configurations for the heating appliance. In particular, the embodiments disclosed herein may have a technical advantage of user convenience as the autonomous system 100 can be controlled remotely, e.g., using a smartphone app, which allows the user to adjust the environment condition in the space without physically interacting with the physical switches or appliances. This can be particularly convenient for users who are unable to reach or operate physical switches or physical appliances.

Figure 5:
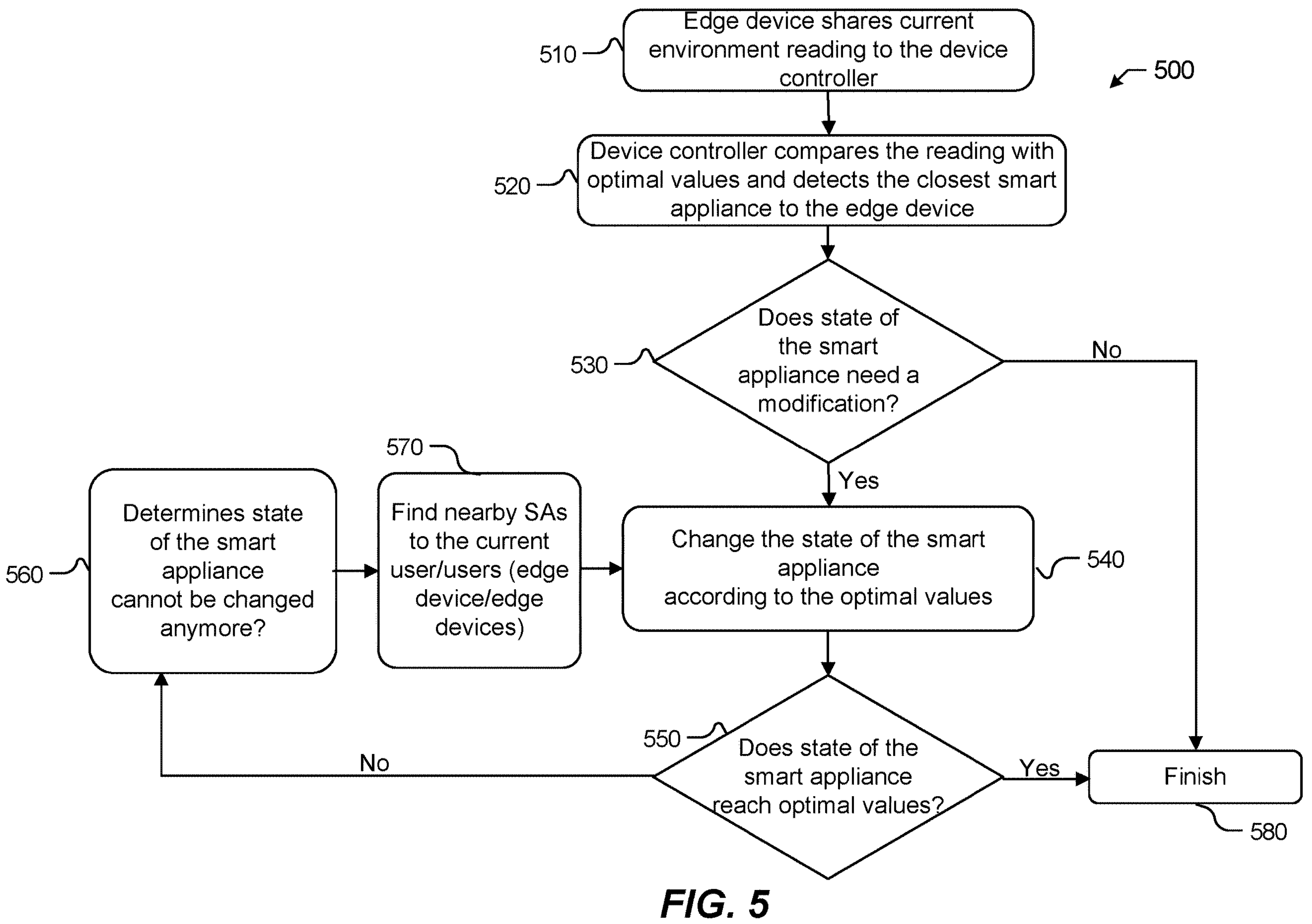
FIG. 5 illustrates an example flow diagram for a feedback-based algorithm.

FIG. 5 illustrates an example flow diagram 500 for a feedback-based algorithm. In particular embodiments, the device controller 110 may use a feedback-based algorithm to determine the modifications to the operating parameters of the nearby smart appliances 130 to the edge device 120. At step 510, the edge device 120 may share current environment reading to the device controller 110. At step 520, the device controller 110 may compare the reading with optimal values and detect the closest smart appliance 130 to the edge device 120. The device controller 110 may determine if the edge device 120 requires a change in the environment state. In other words, at step 530, the device controller 110 may determine whether the state of the closest smart appliance 130 needs a modification.

In a scenario where a modification of the state (e.g., the operating parameters) of the closest smart appliance 130 is required, the device controller 110 may change its state according to the optimal values by modifying it operating parameters at step 540. In particular embodiments, the feedback-based algorithm may then verify whether the modification of the state of the smart appliance 130 has made the environment conditions ideal for the user. As illustrated in FIG. 5, at step 550, the device controller 110 may determine whether the state of the closest smart appliance reach optimal values. In particular embodiments, the device controller 110 may access, from the first edge device 120, second sensor data a second time. The second time may be subsequent to the first time. The device controller 110 may then determine, based on the second sensor data, the one or more environmental parameters in the control area are not satisfied at the second time.

In particular embodiments, the device controller 110 may repeat multiple times the iteration of modifying the state of the closest smart appliance 130 and verifying whether it reaches optimal values. The device controller 110 may determine, responsive to determining that the environmental parameters are not satisfied, one or more second modifications to the one or more operating parameters of the first smart appliance 130. In particular embodiments, the one or more second modifications to the one or more operating parameters may be based on the second sensor data. The device controller 110 may further send, to the first smart appliance 230, instructions for modifying the one or more operating parameters based on the second modifications.

At step 560, the device controller 110 may determine the state of the closest smart appliance 130 cannot be changed anymore. Subsequently at step 570, the device controller 110 may find another nearby smart appliance 130 to the current user/users (edge device 120/edge devices 120). After finding another nearby smart appliance 130, the device controller 110 may repeat step 540 through step 570. In particular embodiments, the device controller 110 may access, from the first edge device 120, second sensor data and second relative displacement data at a second time. The second time may be subsequent to the first time. The device controller 110 may then determine, based on the second sensor data, the one or more environmental parameters in the control area are not satisfied at the second time. In particular embodiments, the device controller 110 may select, responsive to determining that the environmental parameters are not satisfied, a second smart appliance 130 of the plurality of smart appliances 130 based on the second relative displacement data. The device controller 110 may then determine one or more second modifications to one or more operating parameters of the second smart appliance 130. In particular embodiments, the one or more second modifications to the one or more operating parameters of the second smart appliance 130 may be based on the second sensor data. The device controller 110 may further send, to the second smart appliance 130, instructions for modifying the one or more operating parameters of the second smart appliance 130 based on the second modifications. The device controller 110 may keep repeating the modifications to the nearby smart appliances 130 until it is able to find a desired environment condition. In a scenario where desired environment condition is not obtained, the device controller 110 may try to achieve an optimal (best possible) environment condition.

As illustrated in FIG. 5, if the state of the smart appliance 130 does not need a modification as determined at step 530 or if the state of the smart appliance 130 reaches the optimal values as determined at step 550, the feedback-based algorithm may finish at step 580. Using a feedback-based algorithm to modify operating parameters of smart appliances 130 may be an effective solution for addressing the technical challenge of adaptively modifying operating parameters of smart appliances 130 as the feedback-based algorithm can provide information in an iterative manner about whether modifying operating parameters of a smart appliance 130 helps reach the optimal environment condition and whether operating parameters of one or more other smart appliance 130 should be modified to reach the optimal environment condition.

In particular embodiments, smart appliances 130 may have varying properties. As an example and not by way of limitation, smart lights may come with different voltages and brightness, which leads to some lights brightening a larger area than others. As another example and not by way of limitation, different heating appliances may have different ranges where their effects can be observed. To handle this variability, the embodiments disclosed herein use configurations associated with each of the smart appliances to facilitate the optimal control of them. In particular embodiments, each smart appliance 130 may have a different configuration associated with it. As an example and not by way of limitation, the configuration may define the radius of a lighting appliance or a heating appliance. The configuration may also have a threshold illumination value for the lighting space or an optimal temperature threshold for the space. The configuration may also have information about the purpose of the space (e.g., corridors or work area) where the light is. In particular embodiments, recommended light levels may be defined using the illumination standards. The recommended light levels may be used as a threshold for a given space. As an example and not by way of limitation, if the observed illuminance is below the suggested threshold, the lights may be turned on for the given space. In particular embodiments, these configurations may be accessed and edited by the users. As an example and not by way of limitation, a user may access the configuration using a web link or an QR code where the user can change the configuration for a particular space where there are one or more smart bulbs.

In particular embodiments, a user may override the modifications of the operating parameters of a smart appliance 130 determined by the device controller 110. There may be different ways. As an example and not by way of limitation, the user may use a smartphone app to override. Many automated IoT control systems may be controlled remotely through a smartphone app or a web app that can be launched using a QR code. The app may allow the user to adjust the settings determined by the device controller 110, such as the intensity of the lights or the overall lighting scheme. As another example and not by way of limitation, the user may use physical smart switches to override. Some automated light control systems may be connected to physical switches such as wall switches or dimmers. These switches may be used to manually override the settings determined by the device controller 110 and control the lights directly.

Figure 6:
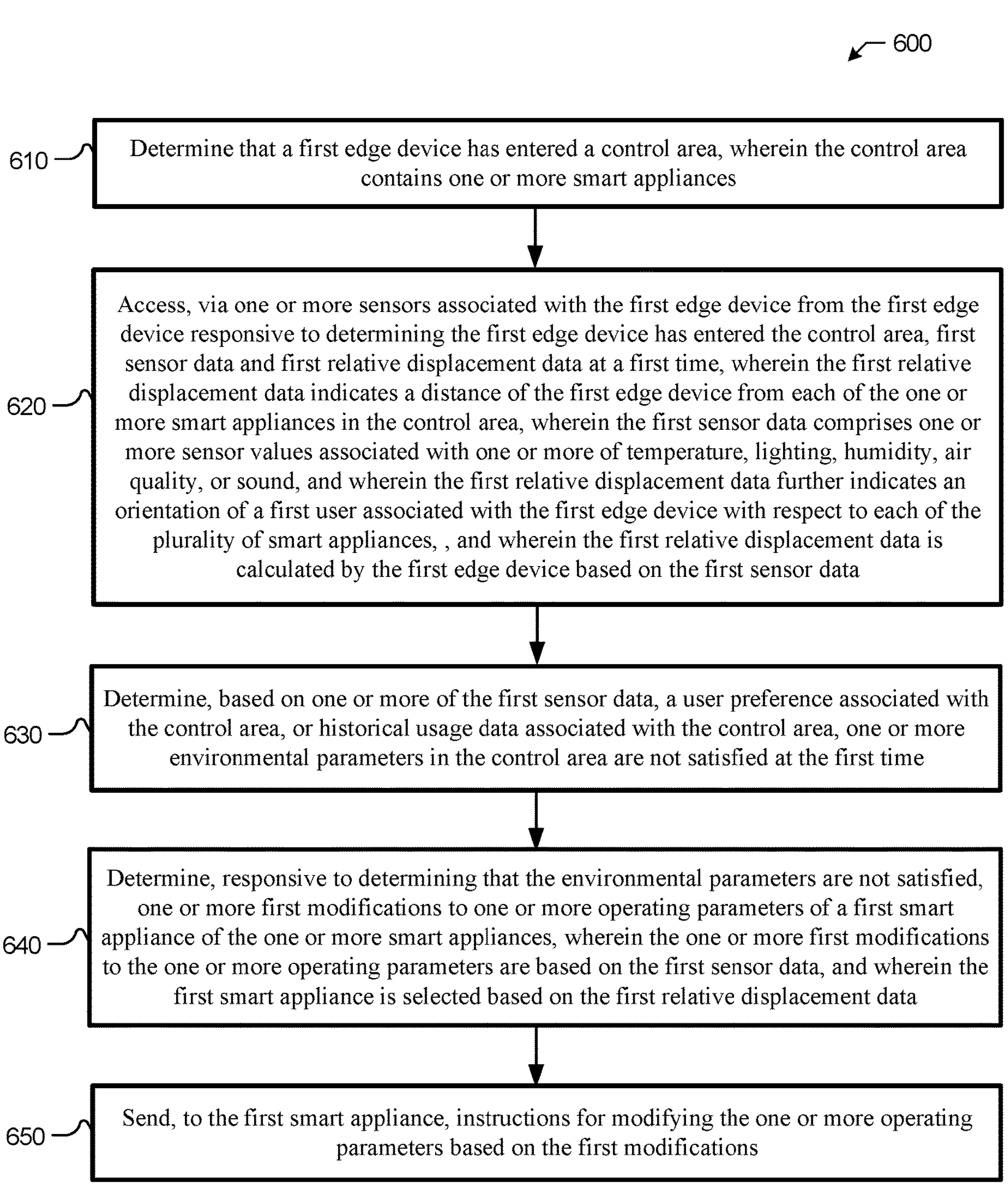
FIG. 6 illustrates is a flow diagram of a method for automated control of smart appliances, in accordance with the presently disclosed embodiments.

FIG. 6 illustrates is a flow diagram of a method 600 for automated control of smart appliances, in accordance with the presently disclosed embodiments. The method 600 may be performed utilizing one or more processing devices (e.g., a device controller 110) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 600 may begin at step 610 with the one or more processing devices (e.g., the device controller 110). For example, in particular embodiments, the device controller 110 may determine that a first edge device 120 has entered a control area, wherein the control area contains one or more smart appliances 130. The method 600 may then continue at step 620 with the one or more processing devices (e.g., the device controller 110). For example, in particular embodiments, the device controller 110 may access, via one or more sensors associated with the first edge device from the first edge device 120 responsive to determining the first edge device 120 has entered the control area, first sensor data and first relative displacement data at a first time, wherein the first relative displacement data indicates a distance of the first edge device 120 from each of the plurality of smart appliances in the control area, wherein the first sensor data comprises one or more sensor values associated with one or more of temperature, lighting, humidity, air quality, or sound, and wherein the first relative displacement data further indicates an orientation of a first user associated with the first edge device 120 with respect to each of the plurality of smart appliances 130. The method 600 may then continue at step 630 with the one or more processing devices (e.g., the device controller 110). For example, in particular embodiments, the device controller 110 may determine, based on one or more of the first sensor data, a user preference associated with the control area, or historical usage data associated with the control area, one or more environmental parameters in the control area are not satisfied at the first time. The method 600 may then continue at block 640 with the one or more processing devices (e.g., the device controller 110). For example, in particular embodiments, the device controller 110 may determine, responsive to determining that the environmental parameters are not satisfied, one or more first modifications to one or more operating parameters of a first smart appliance 130 of the plurality of smart appliances 130, wherein the one or more first modifications to the one or more operating parameters are based on the first sensor data, and wherein the first smart appliance 130 is selected based on the first relative displacement data. The method 600 may then continue at step 650 with the one or more processing devices (e.g., the device controller 110). For example, in particular embodiments, the device controller 110 may send, to the first smart appliance 130, instructions for modifying the one or more operating parameters based on the first modifications. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for automated control of smart appliances including the particular steps of the method of FIG. 6, this disclosure contemplates any suitable method for automated control of smart appliances including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
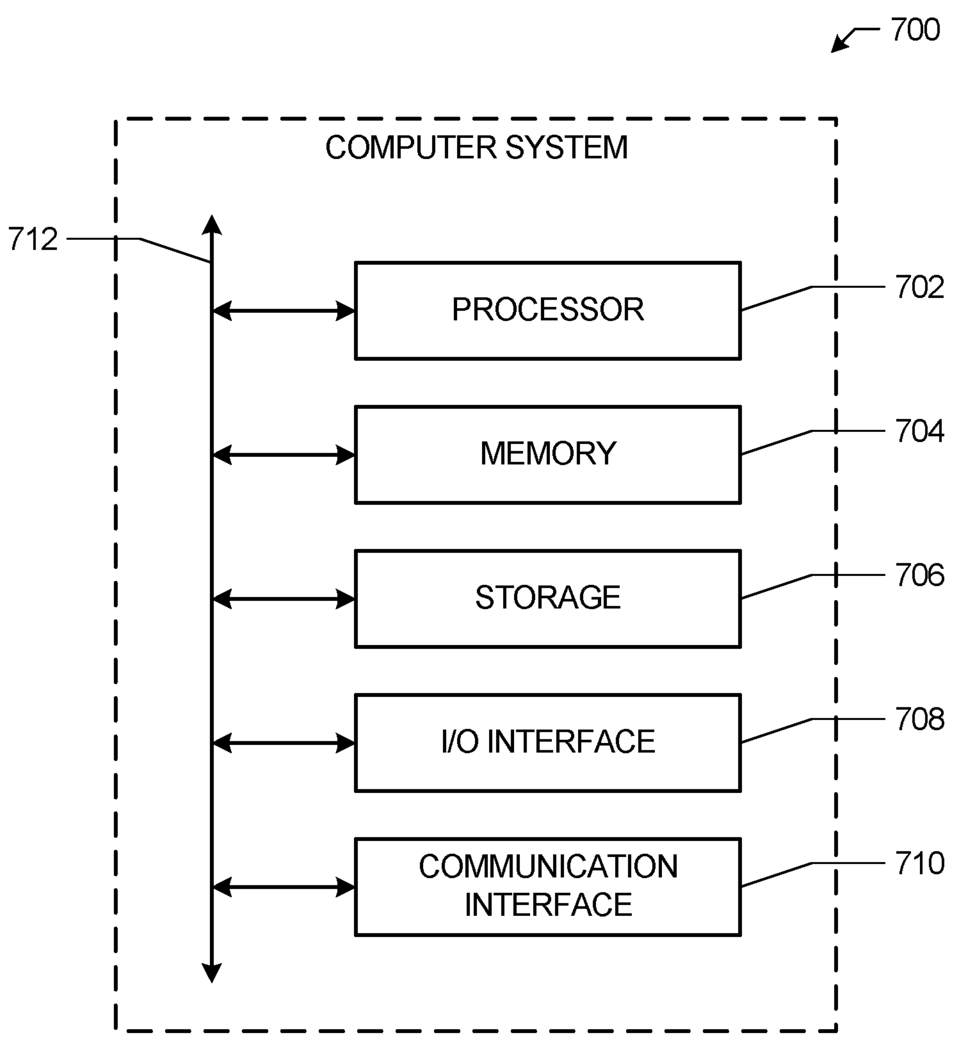
FIG. 7 illustrates an example computer system that may be utilized to perform automated control of smart appliances, in accordance with the presently disclosed embodiments.

FIG. 7 illustrates an example computer system 700 that may be utilized to perform automated control of smart appliances, in accordance with the presently disclosed embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement. In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memory devices, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a device controller:

determining that a first edge device has entered a control area, wherein the control area contains a plurality of smart appliances, wherein the plurality of smart appliances comprise a first smart appliance and a second smart appliance, wherein the first smart appliance is associated with a first active user list specifying one or more second edge devices, wherein the second smart appliance is associated with a second active user list specifying one or more third edge devices, and wherein the one or more third edge devices are outside the first active user list;

accessing, via one or more sensors associated with the first edge device and responsive to determining the first edge device has entered the control area, first sensor data and first relative displacement data at a first time, wherein the first relative displacement data indicates a distance of the first edge device from each of the plurality of smart appliances in the control area, and wherein the first relative displacement data is calculated by the first edge device based on the first sensor data;

accessing, from each of the one or more second edge devices, second sensor data at the first time;

determining, based on the first sensor data, one or more environmental parameters in the control area are not satisfied at the first time;

determining, responsive to determining that the one or more environmental parameters are not satisfied, one or more first modifications to one or more operating parameters of the first smart appliance, wherein the one or more first modifications to the one or more operating parameters are based on the first and second sensor data, and wherein the first smart appliance is selected based on the first relative displacement data;

sending, to the first smart appliance, instructions for modifying the one or more operating parameters based on the one or more first modifications;

accessing, from the first edge device, third sensor data and second relative displacement data at a second time, wherein the second time is subsequent to the first time;

determining, based on the third sensor data, the one or more environmental parameters in the control area are not satisfied at the second time;

determining additional modifications to the one or more operating parameters of the first smart appliance are unavailable to satisfy the one or more environmental parameters in the control area;

determining modifications to operating parameters of another smart appliance in the control area are required to satisfy the one or more environmental parameters in the control area;

selecting the second smart appliance based on the second relative displacement data;

accessing, from each of the third edge devices, fourth sensor data at the second time;

determining one or more second modifications to one or more operating parameters of the second smart appliance, wherein the one or more second modifications to the one or more operating parameters of the second smart appliance are based on the third and fourth sensor data; and sending, to the second smart appliance, instructions for modifying the one or more operating parameters of the second smart appliance based on the one or more second modifications.

2. The method of claim 1, further comprising:

accessing, from the first edge device, fifth sensor data a third time, wherein the third time is subsequent to the first time and prior to the second time;

determining, based on the fifth sensor data, the one or more environmental parameters in the control area are not satisfied at the third time;

determining, responsive to determining that the one or more environmental parameters are not satisfied, one or more third modifications to the one or more operating parameters of the first smart appliance, wherein the one or more third modifications to the one or more operating parameters are based on the fifth sensor data; and sending, to the first smart appliance, instructions for modifying the one or more operating parameters of the first smart appliance based on the one or more third modifications.

3. The method of claim 1, wherein determining the one or more environmental parameters in the control area are not satisfied at the first or second time is further based on user preferences associated with the control area.

4. The method of claim 1, wherein determining the one or more environmental parameters in the control area are not satisfied at the first or second time is further based on historical usage data associated with the control area.

5. The method of claim 1, wherein the first sensor data comprises one or more sensor values associated with one or more of temperature, lighting, humidity, air quality, or sound.

6. The method of claim 1, wherein the first relative displacement data further indicates an orientation of a first user associated with the first edge device with respect to each of the plurality of smart appliances.

7. The method of claim 1, further comprising:

determining that a fourth edge device has entered the control area; and accessing, from the fourth edge device responsive to determining the fourth edge device has entered the control area, fifth sensor data and third relative displacement data, wherein the third relative displacement data indicates a distance of the fourth edge device from each of the plurality of smart appliances;

wherein determining the one or more environmental parameters in the control area are not satisfied at the first or second time is further based on the fifth sensor data, and wherein the first smart appliance is selected further based on the third relative displacement data.

8. An electronic device comprising:

one or more displays;

one or more non-transitory computer-readable storage media including instructions; and one or more processors coupled to the storage media, the one or more processors configured to execute the instructions to:

determine that a first edge device has entered a control area, wherein the control area contains a plurality of smart appliances, wherein the plurality of smart appliances comprise a first smart appliance and a second smart appliance, wherein the first smart appliance is associated with a first active user list specifying one or more second edge devices, wherein the second smart appliance is associated with a second active user list specifying one or more third edge devices, and wherein the one or more third edge devices are outside the first active user list;

access, via one or more sensors associated with the first edge device and responsive to determining the first edge device has entered the control area, first sensor data and first relative displacement data at a first time, wherein the first relative displacement data indicates a distance of the first edge device from each of the plurality of smart appliances in the control area, and wherein the first relative displacement data is calculated by the first edge device based on the first sensor data;

access, from each of the one or more second edge devices, second sensor data at the first time;

determine, based on the first sensor data, one or more environmental parameters in the control area are not satisfied at the first time;

determine, responsive to determining that the one or more environmental parameters are not satisfied, one or more first modifications to one or more operating parameters of the first smart appliance, wherein the one or more first modifications to the one or more operating parameters are based on the first and second sensor data, and wherein the first smart appliance is selected based on the first relative displacement data;

send, to the first smart appliance, instructions for modifying the one or more operating parameters based on the one or more first modifications;

access, from the first edge device, third sensor data and second relative displacement data at a second time, wherein the second time is subsequent to the first time;

determine, based on the third sensor data, the one or more environmental parameters in the control area are not satisfied at the second time;

determine additional modifications to the one or more operating parameters of the first smart appliance are unavailable to satisfy the one or more environmental parameters in the control area;

determine modifications to operating parameters of another smart appliance in the control area are required to satisfy the one or more environmental parameters in the control area;

select the second smart appliance based on the second relative displacement data;

access, from each of the third edge devices, fourth sensor data at the second time;

determine one or more second modifications to one or more operating parameters of the second smart appliance, wherein the one or more second modifications to the one or more operating parameters of the second smart appliance are based on the third and fourth sensor data; and send, to the second smart appliance, instructions for modifying the one or more operating parameters of the second smart appliance based on the one or more second modifications.

9. The electronic device of claim 8, wherein the one or more processors are further configured to execute the instructions to:

access, from the first edge device, fifth sensor data a third time, wherein the third time is subsequent to the first time and prior to the second time;

determine, based on the fifth sensor data, the one or more environmental parameters in the control area are not satisfied at the third time;

determine, responsive to determining that the one or more environmental parameters are not satisfied, one or more third modifications to the one or more operating parameters of the first smart appliance, wherein the one or more third modifications to the one or more operating parameters are based on the fifth sensor data; and send, to the first smart appliance, instructions for modifying the one or more operating parameters of the first smart appliance based on the one or more third modifications.

10. The electronic device of claim 8, wherein determining the one or more environmental parameters in the control area are not satisfied at the first or second time is further based on user preferences associated with the control area.

11. The electronic device of claim 8, wherein determining the one or more environmental parameters in the control area are not satisfied at the first or second time is further based on historical usage data associated with the control area.

12. The electronic device of claim 8, wherein the first sensor data comprises one or more sensor values associated with one or more of temperature, lighting, humidity, air quality, or sound.

13. The electronic device of claim 8, wherein the first relative displacement data further indicates an orientation of a first user associated with the first edge device with respect to each of the plurality of smart appliances.

14. A computer-readable non-transitory storage media comprising instructions executable by a processor to:

determine that a first edge device has entered a control area, wherein the control area contains a plurality of smart appliances, wherein the plurality of smart appliances comprise a first smart appliance and a second smart appliance, wherein the first smart appliance is associated with a first active user list specifying one or more second edge devices, wherein the second smart appliance is associated with a second active user list specifying one or more third edge devices, and wherein the one or more third edge devices are outside the first active user list;

access, via one or more sensors associated with the first edge device and responsive to determining the first edge device has entered the control area, first sensor data and first relative displacement data at a first time, wherein the first relative displacement data indicates a distance of the first edge device from each of the plurality of smart appliances in the control area, and wherein the first relative displacement data is calculated by the first edge device based on the first sensor data;

access, from each of the one or more second edge devices, second sensor data at the first time;

determine, based on the first sensor data, one or more environmental parameters in the control area are not satisfied at the first time;

determine, responsive to determining that the one or more environmental parameters are not satisfied, one or more first modifications to one or more operating parameters of the first smart appliance, wherein the one or more first modifications to the one or more operating parameters are based on the first and second sensor data, and wherein the first smart appliance is selected based on the first relative displacement data;

send, to the first smart appliance, instructions for modifying the one or more operating parameters based on the one or more first modifications;

access, from the first edge device, third sensor data and second relative displacement data at a second time, wherein the second time is subsequent to the first time;

determine, based on the third sensor data, the one or more environmental parameters in the control area are not satisfied at the second time;

determine additional modifications to the one or more operating parameters of the first smart appliance are unavailable to satisfy the one or more environmental parameters in the control area;

determine modifications to operating parameters of another smart appliance in the control area are required to satisfy the one or more environmental parameters in the control area;

select the second smart appliance based on the second relative displacement data;

access, from each of the third edge devices, fourth sensor data at the second time;

determine one or more second modifications to one or more operating parameters of the second smart appliance, wherein the one or more second modifications to the one or more operating parameters of the second smart appliance are based on the third and fourth sensor data; and send, to the second smart appliance, instructions for modifying the one or more operating parameters of the second smart appliance based on the one or more second modifications.

15. The media of claim 14, wherein the instructions are further executable by the processor to:

access, from the first edge device, fifth sensor data a third time, wherein the third time is subsequent to the first time and prior to the second time;

determine, based on the fifth sensor data, the one or more environmental parameters in the control area are not satisfied at the third time;

determine, responsive to determining that the environmental parameters are not satisfied, one or more third modifications to the one or more operating parameters of the first smart appliance, wherein the one or more third modifications to the one or more operating parameters are based on the fifth sensor data; and send, to the first smart appliance, instructions for modifying the one or more operating parameters of the first smart appliance based on the one or more third modifications.

16. The media of claim 14, wherein determining the one or more environmental parameters in the control area are not satisfied at the first or second time is further based on user preferences associated with the control area.

17. The media of claim 14, wherein determining the one or more environmental parameters in the control area are not satisfied at the first or second time is further based on historical usage data associated with the control area.

* * * * *